United States Patent
Brewer

[15] 3,635,409
[45] Jan. 18, 1972

[54] INTEGRATED MUNICIPAL WASTE PROCESSING SYSTEM AND METHOD

[72] Inventor: John C. Brewer, Salt Lake City, Utah
[73] Assignee: Garbalizer Corporation of America, Salt Lake City, Utah
[22] Filed: Aug. 3, 1970
[21] Appl. No.: 60,353

Related U.S. Application Data

[63] Continuation-in-part of Ser. No. 707,910, Feb. 5, 1968, abandoned.

[52] U.S. Cl................................................241/43, 241/76
[51] Int. Cl.................................................................B02c 15/00
[58] Field of Search..................241/43, 45, 46.02, 46.15, 69, 241/76, 78, 79, 101; 71/12, 13, 14

[56] References Cited

UNITED STATES PATENTS

| | | | |
|---|---|---|---|
| 3,283,698 | 11/1966 | Williams | 241/101 R |
| 3,335,968 | 8/1967 | Young | 241/76 X |
| 3,477,649 | 11/1969 | Dalberg et al. | 241/76 X |
| 3,524,594 | 8/1970 | Anderson | 241/76 X |
| 3,549,092 | 12/1970 | Baxter, Jr. | 241/69 X |
| 3,565,350 | 2/1971 | Combs | 241/101 R |
| 3,579,320 | 5/1971 | Pesses | 71/13 X |

Primary Examiner—Granville Y. Custer, Jr.
Attorney—M. Ralph Shaffer

[57] ABSTRACT

The present invention provides a system and method for processing municipal waste into useable products. In a preferred form of the invention the same may be utilized as a composting plant having a rapid time cycle, requiring for batch or continuous feed through operation, a small fraction of the processing time required by conventional biochemical composting plants. Central in the invention is the concept of utilizing a ball-mill to pulverize incoming materials. Specifically usable as a unique combination for municipal waste processing is a wet-grind ball-mill stage followed by a dry-grind ball-mill stage, nonfloatables being reduced by the former and floatables being reduced by the latter. Preferably, both outputs are later combined prior to compacting to produce a usable end product. Heat is supplied in the dry-grind ball-mill stage to preclude layer build up on the interior walls of the ball-mill. In one form of the invention the system or method is used in conjunction with a municipal sewage treatment plant wherein the liquid and sludge phases thereof are utilized in the system and method for milling and also for enriching the materials developed in the system and method, for ultimate processing as a useable fertilizer product.

9 Claims, 9 Drawing Figures

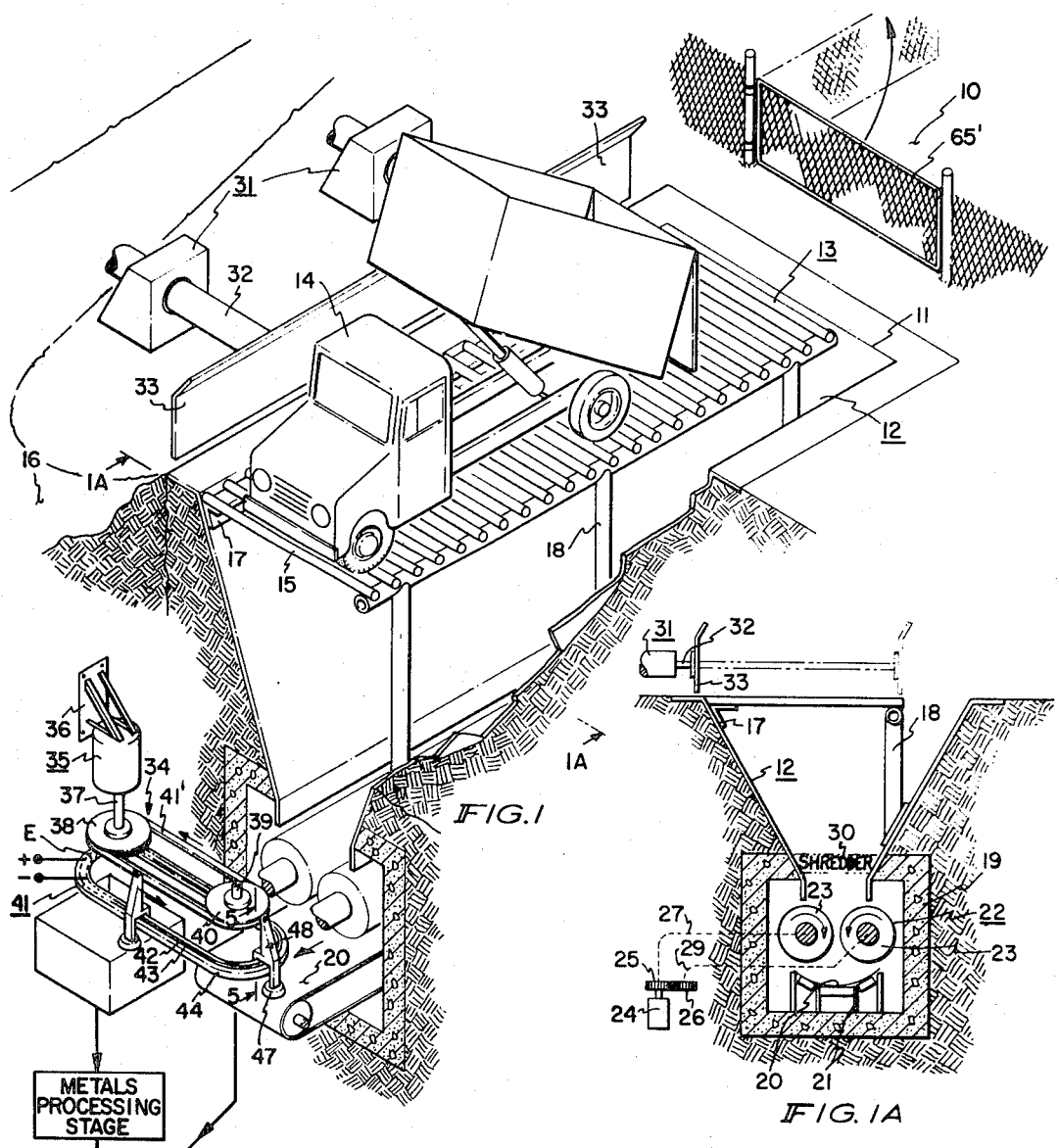
FIG.1
FIG.1A
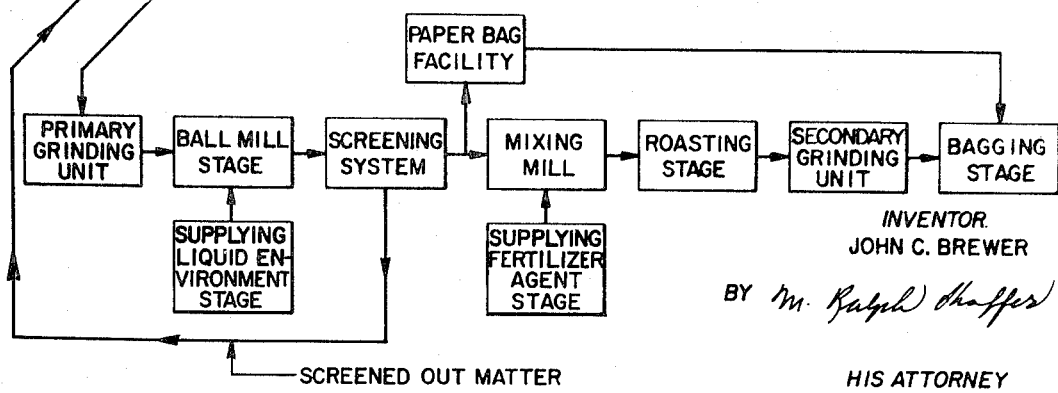
INVENTOR.
JOHN C. BREWER
BY M. Ralph Shaffer
HIS ATTORNEY

INVENTOR.
JOHN C. BREWER

HIS ATTORNEY

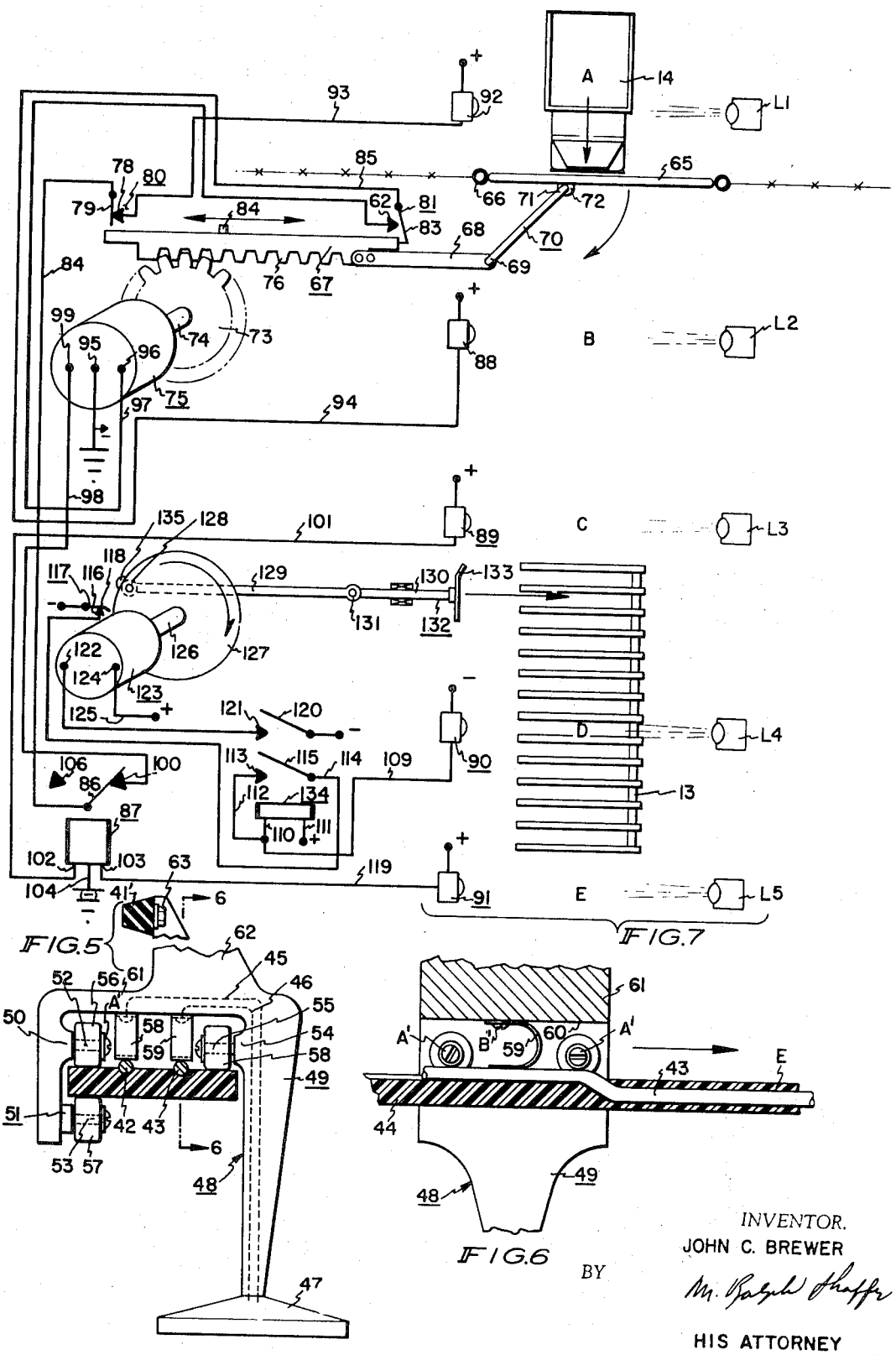

INTEGRATED MUNICIPAL WASTE PROCESSING SYSTEM AND METHOD

This application is a continuation-in-part of a copending patent application entitled Integrated Garbage Processing System and Method, Ser. No. 707,910, filed Feb. 5, 1968, now abandoned.

The present invention relates to fertilizer systems and methods and, more particularly, to a new and improved integrated method and system for processing municipal waste such as garbage into a useable fertilizer product. The invention includes a provision for incorporation of the system or method with a municipal sewage treatment plant, the latter supplying liquid and sludge phases which are properly useable in the milling and also the mixing stages of the method or system. Means are provided for roasting the resultant slurry to reduce bacteria count, consume cellulose material such as paper and so forth. Means are provided for recovering metals from the municipal waste and for processing these independently for delivery in suitable form to commercial users. Suitable collecting means is provided so that dump trucks may easily and safely unload city refuse therein, for processing by the system, in a safe and convenient manner.

In the past cities and towns have had extreme difficulty in disposing of the voluminous amounts from municipal waste and refuse produced in municipalities each day. One disposal method that has been used is simply in burying the garbage in adjacent land. Another method is simply to deposit garbage in streams and rivers, thereby polluting the same.

Some slight advance has been made in the past in processing certain types of refuse by increasing anaerobic bacteria count so as to use the same in some type of fertilizer product. Attempts in this field, however, have been somewhat unsatisfactory both from an end-product point of view and also from feasibility for a desirably continuous process.

The present invention relates to municipal waste treatment, and in particular, presents a process or system by which municipal waste can satisfactorily be reduced to a power and then simply disposed of or, preferably; treated in such a manner as to provide a useful compost end product.

The term "municipal waste" as used herein is not limited merely to household garbage, i.e., food garbage, paper, and excrement, with which prior processes have been concerned, nor even to household waste, i.e. household i.e., plus cans, glass, and leather, but embraces all of the above plus the other components of municipal waste, e.g., car bodies and parts, street sweepings, rock, dirt, leaves, trees and shrubbery, tires and other rubber products, broken furniture, construction debris, appliances, and so forth. Practical reduction of such a comprehensive class materials, i.e., "municipal waste," is unknown in the art.

Municipal waste as above described is a constant problem to municipalities as to efficient and economical disposal. The basic problem is one of attempting to find a way of reducing in size all of these materials in an economic and efficient manner for proper disposal. Also, it is important to turn to advantage such huge volumes of present municipal waste by rapidly treating the same to render a suitable end product in the form of compost. Biochemical composting plants are common but require prior hand sorting of bacteria resistant materials, e.g., metals, glass, plastics as well as from 6 to 44 days as to time cycle to reduce, by bacterial action, fibrous and food product organic materials contained in the municipal waste, so that a suitable compost product can be produced.

The present invention substitutes for biochemical action of conventional plants a simple size reduction and composting operation compatible therewith to markedly reduce to a matter of 2 hours or less the time required to process municipal waste into compost.

In the copending patent application by the same inventor and entitled Integrated Garbage Processing System and Method, Ser. No. 707,910, filed Feb. 8, 1968, which is fully incorporated herein by way of reference, the inventor has disclosed a suitable system and process, the basic feature of which is the concept of shredding municipal waste materials and then milling the same.

The present invention contributes to the art of municipal waste reduction and processing by means of several major fundamental concepts, all of which are adequately and fully disclosed hereinafter. A first fundamental concept is that of employing a ball-mill to reduce to powder, i.e., of a particulate particle size of one-sixteenth inch or less, all municipal waste materials. These will include all of the materials above described of which municipal waste is comprised. It is no small feat to reduce items of furniture, rubber, plastics, matted cotton, paper products, and so forth to a small particulate size. The inventor is the first to discover that a ball-mill can completely pulverize and reduce in fact to powder the wide variety of materials as above described as found in municipal waste.

The second discovery the inventor has noted is the fact that a double ball-mill system can be used to great advantage in reducing municipal waste, with liquid being mixed with the input solids in the first ball-mill, to be operated wet, and with the floatables from the first ball-mill being conveyed to a second ball-mill to be reduced to powder. It has been found that wet over dry reduction speeds the reduction process by a factor of at least three, as where shredded municipal waste materials are introduced into a wet carrier or environment within the wet operated ball-mill. Of course, floatables such as rubber, plastics, and most woods will be maintained at the fluid level within the ball-mill and hence can be floated out through the open axial hub of the ball-mill for subsequent processing. In fact, the liquid, the floatables, and the ground nonfloatables may proceed out that hub to be separated such that the liquid is returned to the liquid supplying source of the system, the floatables to a second stage for water reduction, and the ground nonfloatables routed to a solids-liquid separator and to a mixer for ultimate mixing with the ground product of the floatables.

Another important concept is that of employing heat exterior to the outside wall of a dry-grind ball-mill so as to reduce the moisture content of materials being ground in the ball-mill and likewise to prevent materials therein sticking to the inner sidewall of the mill. This is the first time to the inventor's knowledge that heat has been employed in connection with a ball-mill or indeed in connection with any mill where heat is applied exterior to the mill. With interior introduction of heat, such as heated air within the interior of the mill, operation is unsatisfactory since the heated air does not comingle with materials beneath the balls, that is, between the balls and the interior lining or wall of the mill cylinder, and material tends to stick to the wall. Where heat is applied exterior of the cylinder, then the materials adjacent the walls do not stick thereto, but are heated and dried adequately; moisture vapor is exhausted upwardly from the mill. To be effective, the heat applied to the ball-mill should be such that the interior of the mill is maintained at a temperature in excess of the boiling point of water at the altitude at which the operation is being performed.

The system also includes a roasting stage wherein materials fed to it are roasted but not incinerated. This is for the purpose of supplying, as an end product, a useful compost.

Accordingly, the principal object of the present invention is to provide an improved system and process of an integrated nature for processing municipal waste into a useable fertilizer product.

An additional object is to provide an integrated system and process for processing municipal waste, and which utilizes the municipal treatment plant in that the sludge and liquid phases thereof are utilized in the various stages in the system and process.

A further object of the invention is to provide an improved dump facility which provides safe, continuous collection and processing of materials dumped therein by conventional vehicles.

A further object is to provide a system and process for processing garbage wherein the system includes roasting means for reducing the count of unwanted bacteria in the garbage.

A further object is to provide a composting plant employing mechanical reduction rather than biochemical treatment.

An additional object is to provide a new and improved size reduction device for municipal waste reduction systems; namely, a ball-mill, to reduce objects to powder.

A further object is to provide, as a milling and drying system for municipal waste, an externally heated ball-mill.

A further object is to provide a wet-grind, dry-grind ball-mill system wherein a pair of ball-mill stages are coupled together such that wet-grind is performed first, and dry-grind is performed after. This is to speed up and facilitate the grinding of both floatables and nonfloatables present in municipal waste.

A further object is to provide a composting machine wherein a compost end product, rich in body, is produced.

A further object is to provide in a municipal waste reduction system a ball-mill system facilitating sewage sludge mixing and processing in connection with municipal waste reduction by ball-mill means.

It is to be emphasized that no prior equipment is known whereby all municipal waste can be reduced to powder, except by the inventor's presently disclosed ball-mill. Other types of mills simply will not reduce items such as rubbers, plastic coated papers, wadded cotton and so on to small, particulate powder form.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1, is a diagram, partially in pictorial form and partially in schematic form, of a system incorporating the features of the present invention.

FIG. 1A is a vertical section taken along 1A—1A in FIG. 1.

Figure 3:
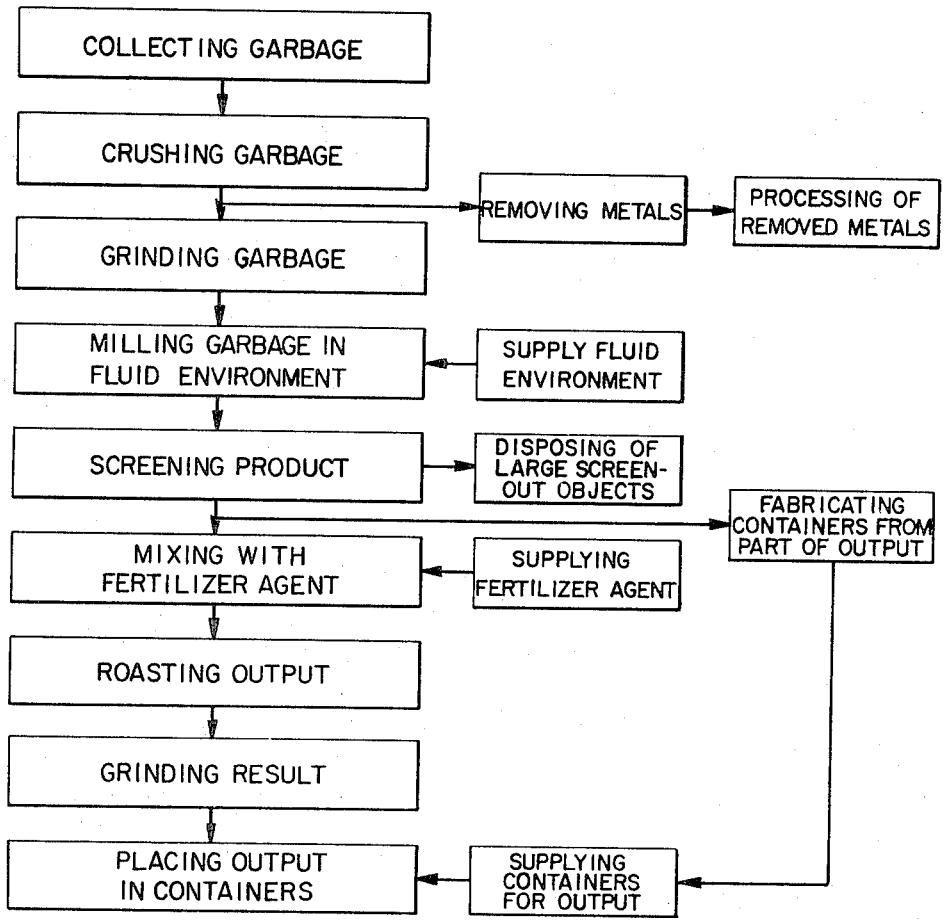

FIG. 3 delineates the complete process, in flow diagram form, of the present invention.

Figure 4:
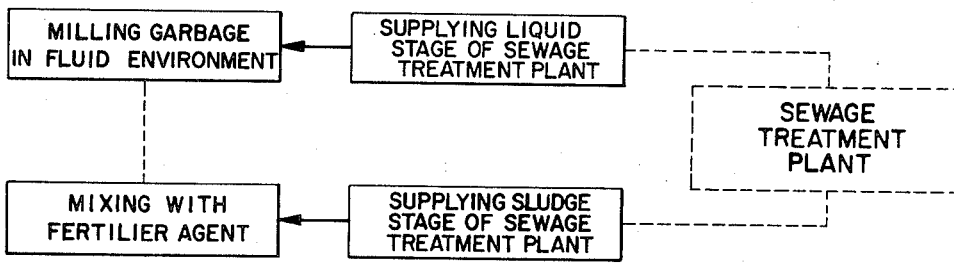

FIG. 4 indicates further delineation of process in FIG. 3 wherein the supplying of liquid and sludge or other fertilizer matter to the milling and mixing steps in the process is provided by a municipal sewage treatment plant.

FIG. 5 is a fragmentary, enlarged section, shown principally in elevation view, of an electromagnet assembly utilized in the metals' recovery stage in the system process.

FIG. 6, is a vertical section taken along the lines 6—6 in FIG. 5.

FIG. 7 is a diagrammatic presentation, principally in schematic form, of a representative, simplified system that can be used in automatically performing certain steps in the described system and method.

Figure 8:
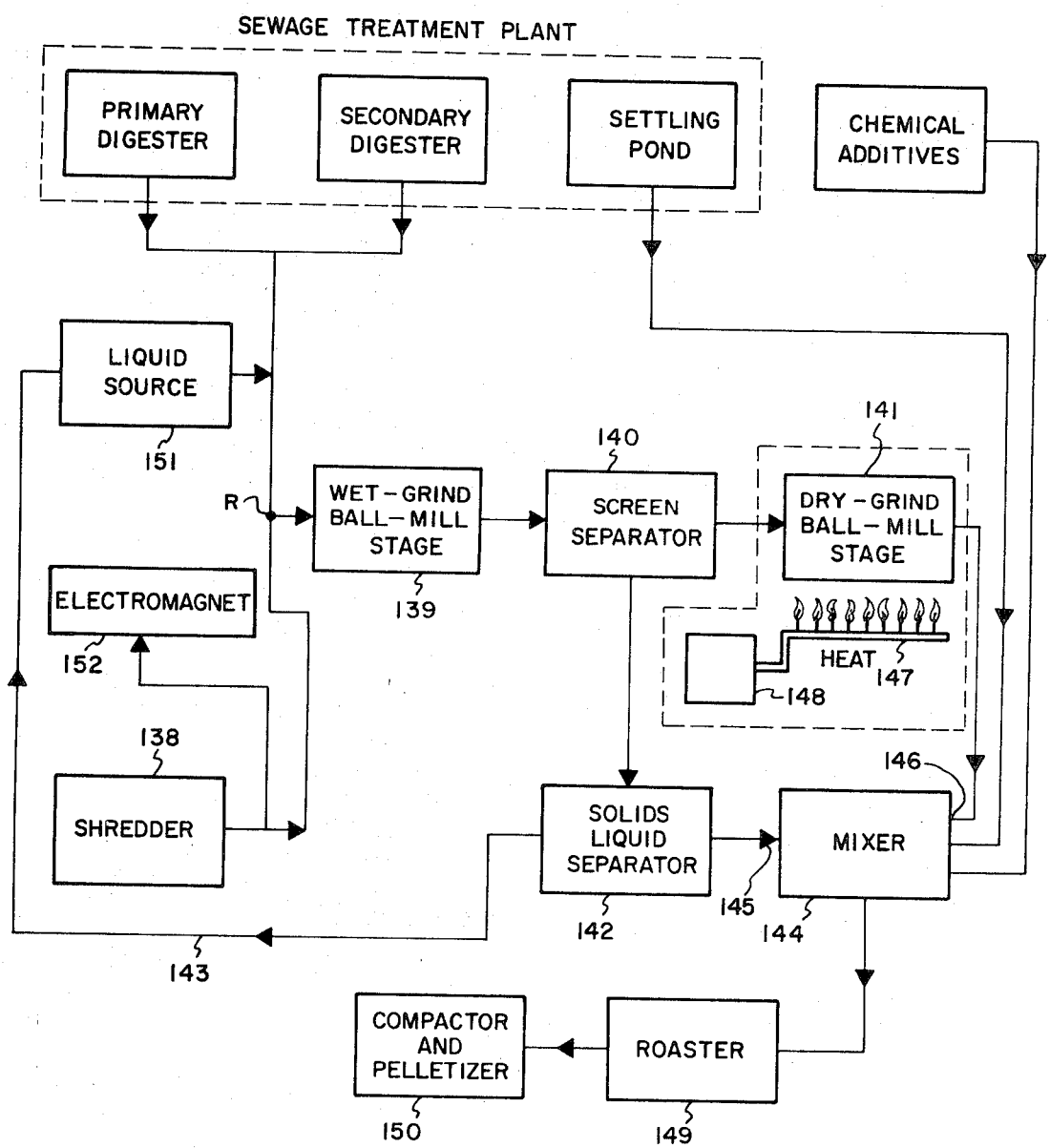

FIG. 8 is a schematic diagram in block form of an alternate form of the invention, wherein certain output from a sewage treatment plant may be utilized in the system.

In FIG. 1 roadway 10 includes an interruption 11 forming a garbage collection hopper 12. Disposed over hopper 12 is a coarse grate 13 over which dump truck 14 can travel. The forward, terminal end 15 of grate 13 is contiguous with the forward, return extension 16 of roadway 10. Suitable structural means 17 and 18 are provided for supporting the grate 13 at its position shown in FIG. 1A. A cement, supporting encasement is disposed at 19 and includes conveyor means 20 suitably supported for operative movement by structural members 21. A crusher stage 22 preferably includes a pair of crusher rollers 23 which are rotated by motor 24 and oppositely rotating gears 25 and 26 coupled thereto. Shafts 27 and 29 carry the rollers 23, the latter being fixedly keyed thereto. The crusher stage also preferably includes a shredder 30 of conventional form see U.S. Pat. Nos. 593,005; 529,796; and 2,562,282 for shredding the material descending into hopper 12. A scraper means 31 includes arm 32 and scraper plate 33 fixedly secured thereto in a conventional manner. Disposed over conveyor belt 20 is a metals recovery stage 34 which includes motor 35 fixedly secured to stationary structure 36. The motor 35 includes an output shaft 37 having pulley wheel 38 keyed thereto. Journaled, likewise, to fixed structure 36 is a shaft 39 to which idler pulley wheel 40 is keyed. A standard V-belt 41' is placed around the pulley wheel shown and is driven by motor 35 in the direction of the arrows, as indicated. Fixedly secured to and beneath the stationary structure 36 is a track member 41 including looped tracks 42 and 43. An insulative base 44 completes the construction and is of a suitable moulded configuration such that the tracks 42 and 43 are imbedded at end E of the looped configuration of the track. Being imbedded in a nonconductive material of which the base 44 is made, then there will be no electrical conductivity of the leads 45 and 46, about to be described, which lead to the electromagnet 47. Electromagnet 47 is part of an electromagnet assembly 48 which also includes inverted J-shaped member 49. Member 49 includes bosses 50 and 51 to which are mounted shafts 52 and 53. Boss 54 is likewise an integral part of member 49 and mounts shaft 55 thereto. The roller shafts 52, 53, 55 are for the purpose of journaling rollers 56, 57 and 58 in the positions shown. Representative attachments A' complete the journal construction. Member 49 is preferably made of nonconductive material and includes electrical wipers 58 and 59, the latter being secured by attachments B' to the underside 60 of portion 61 of the member 49. Upstanding portion 62 of member 49 is secured by suitable means 63 to the V-belt 41", thereby assuming a supporting relationship with respect thereto.

Figure 2:
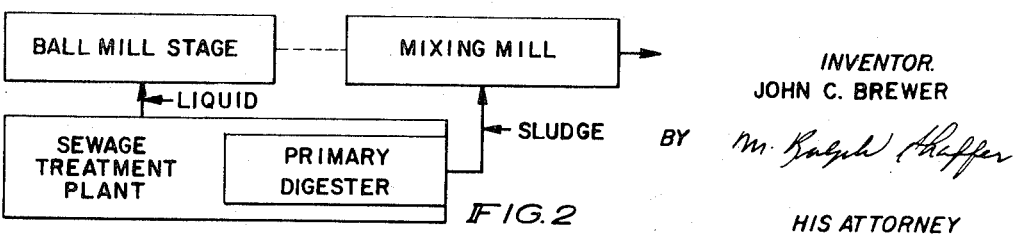
FIG. 2 is a system-subcombination wherein a sewage treatment plant is utilized to supply the liquid and sludge phases to the ball-mill stage and mixing mill of the system shown in FIG. 1.

In FIG. 1 it is seen that the remainder of the system is fed by conveyor belt 20 and includes the primary grinding unit, ball-mill stage, screening system, mixing mill, roasting stage, secondary grinding unit, and bagging stage, in this order. The ball-mill stage must be supplied liquid to constitute therein a liquid environment for materials introduced into the feed-end of the ball-mill stage. The mixing mill is an essentially included stage, is of a design which eliminates most of the liquid from the slurry, and may be coupled to a fertilizer agent source such as an independent chemical fertilizer agent supply or even the sludge stage of a sewage treatment plant as is seen in FIG. 2. In the latter event the liquid from the sewage treatment plant may be fed into the ball-mill stage to form a slurry therein. Depending upon the character of the roasting stage, a secondary grinding unit, such as a second ball-mill stage, may be optionally employed. Likewise, the bagging stage is optionally included for bagging purposes and will not be necessary where the end product is to be shipped in bulk. Likewise, optionally included is a paper bag facility which draws off a portion of the slurry from the screening system and processes it as in a conventional paper mill for making bags suitable for introduction at the bagging stage of the system. If desired, the screening system may, by truck or suitable conveyor, feed materials not properly forming part of the slurry produced back into the metals' processing stage, the latter being coupled to and fed by the metals' recovery stage 34. Such materials as may be fed back by the screening system are rubber aluminum, plastics, etc. It is noted that the metals' recovery stage 34 and the metals' processing stage as so labeled constitute a shunting system for shunting out metals as may be recovered from the materials contained on conveyor belt 20. In small plants or small towns and cities it is conceivable that the metals' recovery and metals processing stages may be eliminated.

The following is a description of the stages in the system of FIG. 1 that have not been previously discussed. As to the metals' processing stage, the same may take the form of a conventional electric furnace which is used to melt down the various metals. Conventionally, these furnaces will use carbon electrodes which produce an electric arc upon contact with the metals. Suitable electric furnaces are of standard manufacture, and are made by the General Electric Company and by Westinghouse Corporation, merely by way of example.

The primary grinding unit may, for example, by composed of a series of solid steel wheels mounted on a rotating shaft. On these wheels will be attached metal teeth which rip and tear the municipal waste into shreds as it is pulled through the stage. The primary grinding unit will reduce the municipal waste into pieces which are small enough as to be capable of being conveyed into the ball-mill stage.

As to the screening system, screens of course are used very commonly to reduce pieces of garbage or other material which cannot be reduced to slurry. In the present invention the screening system can be designed to screen out items such as rubber, plastics, and so forth, and transport the same in through conveyor or separate trucking means to the metals' processing stage. The heat produced in the metals' processing stage is sufficient to burn these items when desired.

Paper bag facilities are in common usage and simply receive a cellulose-containing slurry to process the same into cartons, bags or the like. These are in common manufacturing use and a portion of the slurry from the screening system may be received by the paper bag facility for making suitable containers, such as bags, for supply to the final output of the system where required. Such inclusion in the system will not be needed where the end product is delivered in bulk.

The "mixing" mill, as is typical of the unit described below, is designed to remove or eliminate most if not all of the liquid from the slurry, and will generally, although not necessarily, be used actually to mix an external fertilizer agent with the slurry prior to liquid separation. This will be for the purpose of mixing the slurry coming from the screening system with an external fertilizer agent such as suitable chemical fertilizers or fertilizer additives or even the sludge of a municipal sewage treatment plant. The terms "mixing mill" and "mixing...step" are used herein even though no mixing with an external fertilizer agent actually takes place. The mixing mill when used, may take the form of an Akins Spiral Classifier, as is presently sold by the Mining & Smelting Supply Company of Colorado. This classifier has two spirals extending into a tank or vat containing sludge, slurry and/or other chemical additives. When the spirals are rotated in one direction they cause a pushing action on the contents which produce a mixing result. When the mixing is completed the spirals are reversed to carry and discharge the mixed solids from the spiral onto a conveyor-type belt, there to be conveyed to the roasting stage of the system, while the removed liquid phase is discharged from the classifier top.

The roasting stage preferably comprises a Skinner-type furnace, as presently sold by the Mining & Smelting Supply Company of Colorado above indicated. This furnace is a vertical, cylindrical unit consisting of a series of circular hearths placed one above the other and enclosed in a refractory-lined steel shell. The material to be treated is usually fed to the top hearth for drying. A central shaft rotates rabbles which stir and move the material around and across the hearths, with the material progressing through drop-holes from top to bottom. The most common flow of gas is from bottom to top.

When the dried material reaches the bottom hearth it then will be dumped onto a conveyor-type belt for further grinding as by the secondary grinding unit, or simply for dumping into a bulk storage conveyor or storage unit.

A secondary grinding unit may be used to reduce still further the size of the particles coming from the roasting stage, and the bagging unit may be supplied where bagging of the fertilizer end product is desired.

As to the roasting stage, it is preferred that roasting of the included product be completed in approximately 15 minutes of time at a temperature of 600° F. or less, so as not to incinerate the cellulose paper products, thereby leaving a compost material free of all bacteria. The heat produced in the furnace will be sufficient to kill all bacteria in the municipal waste and yet not exhaust as smoke usable fertilizer chemicals such as potassium nitrate and potash, which will be present. There will be no ash present in the fertilizer to detract from the essentially organic compost constituency of the fertilizer output.

FIG. 2 illustrates one type of use of the system of the present invention. Its commonplace usage of the system with the sewage treatment plant of a municipal sewer system. Thus, the primary digester of the sewage treatment plant produces a sludge output and is mixed with the slurry coming from the ball-mill stage in the mixing mill of the system, to enrich the organic content of the fertilizer slurry. Correspondingly, the liquid phase of the sewage treatment plant can be used to supply the liquid environment in the ball-mill stage, thereby automatically producing a slurry output at the ball-mill stage. It is noted that the secondary digester of the sewage treatment plant can be used simply for water purification purposes, where so desired.

FIG. 3 is a flow sheet of the method or process embodied in the present invention. Steps in the process include specifically collecting municipal waste, crushing municipal waste, grinding municipal waste, milling municipal waste in fluid environment, screening the product, mixing with a fertilizer agent, roasting output, grinding the result, and placing the resultant output in suitable containers. The "mixing step" eliminates the liquid from the slurry, even when there are no external fertilizer agents, such as chemical fertilizers or sewage sludge supplied. Correspondingly, the "grinding result" and "placing output in containers" steps, following the roasting output step, may be deleted where the product is to be stored or shipped in bulk and where the roasting output constitutes a fragmented output of some type.

Optional steps of the process comprise the steps of removing and processing metals subsequent to the crushing step, screening-out large sized objects, fabricating containers, and supplying the same at the step of placing output in the containers, etc. As to the steps of supplying fluid environment and supplying a fertilizer agent to the milling step and mixing step, respectively, the same may be completed, as shown in FIG. 4, through use of a sewage treatment plant, the steps including supplying the liquid phase from the sewage treatment plant to the milling step and supplying the sludge stage of the sewage treatment plant to the mixing step. See FIG. 4 in this regard.

The metal recovery section of the processing system are optional, but are preferably included. An embodiment thereof is illustrated in FIGS. 1, 5 and 6. It will be noted that the electromagnet assemblies 48 in passing over conveyor 20 will pick up various materials and drop the same at end E into a certain metals' processing stage. Of course, any type of movement or conveyor system or truck process may be utilized at this point. An important point in connection with this invention is that, preferably, the conductive rails 42 and 43 are imbedded at end E, in the electrically nonconductive base 44, see FIG. 6, so that there will be an automatic dropping of the metallic materials collected by the electromagnet assemblies 48. Conceivably, other types of systems can be used as, for example, where the magnets move and drop their loads only after specific quantities of materials have been collected by these magnets. The present system is deemed preferable, however, in the automatic nature and feasibility of the metals recovery system as shown.

An important feature of the present invention is that the system and process can be made, if desired, fully automatic and fully continuous. FIG. 7 illustrates a photocell system by which the passage of dump truck 14 into the dumping area and over grade 11, to proceed out of the area via roadway extension 16, will actuate certain devices for gate opening and closing, for scraper operation, and so forth. The conveyor system in all stages can be in continuous operation, if desired; or separate controls, automatic or manual, may be incorporated in the system. Furthermore, private vehicles can be accommodated by their simply dumping their refuse on to the grate 13 and, if desired, by conveying the metals separately to the metals' processing stage used in the system.

In FIG. 7 gate 65 is hinged at 66 and is openable in a direction to that which is opposite to that shown at 65' in FIG. 1. Both methods of gate opening are possible, of course. Rack gear 67 includes an extension 68 which is pivoted to extremity 69 of link 70. The opposite extremity 71 of link 70 is pivoted to appropriate journal 72 of gate 65. Pinion 73 is keyed to shaft 74 of control motor 75, and the teeth of pinion 73 mesh with the teeth 76 of rack gear 67. Contact 78 and arm 79 compose switch 80, whereas switch 81 is composed of contact 82 and switch arm 83. As is shown in FIG. 7, the switch 81 is open and switch 80 closed in the condition shown for rack gear 67. Rack gear protuberance 84' may be used to selectively engage arm 79, at its lower extremity, so as to open switch 80. This, indeed, is accomplished subsequent to energization of motor 65, to open the gate by pulling gate 65 in the direction of the arrow through link 70 and extension 68. Leads 84 and 85 are respectively connected between switch arms 79 and 83 to arm 86 of bistable relay 87 and to the lower terminal of photocell unit 88, as indicated. The upper terminal of photocell unit 88 is maintained at a positive potential as shown. Photocell units 89, 90, 91 and 92 have their upper terminals maintained at the potentials as indicated. The lower terminal of photocell unit 92 is connected to contact 78 by a lead 93. Lead 94 connects lower terminal of photocell unit 88 to switch arm 83. The center terminal 95 are reversing motor 75 is maintained at a ground or negative potential. Terminal 96 of motor 75 is connected by lead 97 to switch contact 62. Lead 98 interconnects motor terminal 99 with contact 100 of bistable relay 87. Lead 101 interconnects the lower side of photocell unit 89 with winding terminal 102 of relay 87. Winding terminal 103 is directly connected by lead 119 to the remaining side of photocell 91. The bistable relay 87 is grounded at 104, and it will be understood that the windings of the relay whose extremities are found at 102 and 103 will be oppositely wound so that energization on the left-hand side of the relay, as schematically shown, will pull arm 86 to the left to engage dead contact 106; thereafter, an impulse must be received by the right-hand side of the relay so as to pull the arm 86 back to contact with contact 100. All photocell units are strictly conventional and will generally include, as is conventional, suitable relays so that a closed-circuit condition exists through the photocell units to the positive or negative terminals indicated when the light beams from respective lights L1, L2, L3, L4 and L5 are interrupted relative to reception thereof by the respective photocell units 92, 88, 89, 90 and 91. The lower terminal of photocell unit 90 is connected by lead 109 to one side of relay 110. The remaining side of relay 110 is maintained at a positive voltage by lead 111. Lead 112 interconnects contact 113 with lead 110. Lead 114 interconnects relay arm 115 with contact 116 of switch 117. The arm 118 of switch 117 is maintained at a negative reference potential, as seen in FIG. 7. Lead 119 interconnects the lower terminal of photocell unit 91 to terminal 103 of relay 87. Arm 120 is maintained at a negative reference potential, as indicated; contact 121 associated therewith is connected to terminal 122 of motor 123. The remaining terminal 124 is maintained at a positive reference potential via lead 125. Motor 123 includes a shaft 126 which is centrally connected to cam wheel 127. Cam wheel 127 includes an eccentric pivot 128 which is connected to the reciprocating, connecting rod 129. Connecting rod 129 includes a pivot extremity 131 to pivotally receive actuating arm 130 of scraper unit 132. A scraper blade 133 is securely and rigidly affixed to arm 130. (These correspond to arm 32 and blade 33 in FIG. 1A.)

Relay 134 is a conventional two-output-circuit relay, and which is normally open. Again, all circuits through the photocell units 92, 88, 89, and 91 are normally open, but closed upon interruption of the light beams from respective lights L1–L5. As to the scraper-actuating mechanism it will be noted that wheel 127 includes a protuberance 135. Protuberance 135 serves to contact arm 118 of switch 117 so as to open this switch momentarily. However, the inertia of shaft 126 and wheel 127 is purposely chosen so that even though the electrical circuit to drive motor 123 is turned off, the wheel 127 will revolve sufficiently to allow switch arm 118 to reengage contact 116.

The system shown in FIG. 7 operates as follows: Assume that a dump truck is at position A so as to interrupt the light beam of light L1 to photocell unit 92. In this event the photocell unit, by its conventional construction, electrically closes so as to supply a positive voltage through switch 80 and closed relay arm 86 and contact 100 of relay 107, back to terminal 99 of motor 75. This produces a rotation of shaft 74 and pinion 73 in a counterclockwise direction so as to drive the rack gear 67 to the left. Such a process continues until protuberance 84' of rack gear 67 engages the lower tip of switch arm 79, so as to open switch 80. At this point there is a circuit interruption between leads 84 and 93, causing motor 75 to turn off. At this point the trunk 14 can be moved forwardly from position A to position B, at which time the light beam from light L2 to photocell unit 88 is interrupted. This closes the circuit of lead 94 to the positive potential of the upper side of photocell unit 88, this in turn completes the circuit through switch 81 (contact 62 is now closed with arm 83), so that the opposite side of motor 75 is energized. This energizes the motor to turn in an opposite direction, to return the rack gear to the right so as to close gate 65. At this point the truck moves to direction to position C so as to close the circuit through photocell unit 89, thereby energizing bistable relay 87 on its left side and thus causing relay arm 86 to switch from its position shown in FIG. 7 to contact the dead contact 106. This interrupts the circuit through contact 100 and switch arm 86, so as to interrupt temporarily all circuit connection to terminal 99 of motor 75. Such action prevents any subsequent dump truck at position A from energizing motor 75 so as to open the gate until the first truck has cleared the dump area.

Truck 14 proceeds to position D at which point light emanating from light source L4 is interrupted to its photocell unit 90, thereby closing this circuit and energizing relay 134. Relay 134 thence energizes and locks over its own contacts via contact 113 at arm 115, at the same time closing the circuit across arm 120 and contact 121 to apply negative voltage to terminal 122 of scraper motor 123. At this point the wheel 127 revolves one complete revolution, or substantially so, so as to actuate back-and-forth the scraper blade 133 via the eccentric connection of connecting rod 129 to wheel 127 and the connection of journaled arm 130 to connecting rod 129. Protuberance 135 traverses in a clockwise direction until it opens switch 116, through urging upwardly arm 118 of switch 117. Thus, the negative potential is removed from lead 114. This will operate to deenergize relay 134 unless the truck remains in position D, in which even a voltage potential will be supplied across the primary connections of relay 134. Thus, in the process the vehicle has dumped its load and such other load as has not fallen through the grate 13 in FIG. 1 of its own weight will be pushed (after the truck has passed) by the scraper blade 133 over the side of the grate to fall downwardly into the hopper as seen in FIGS. 1 and 1A. Subsequently, the truck may be moved to position E to energize the opposite side of bistable relay 88, thereby indirectly pulling the relay arm 86 to contact the contact 100 and thus completing the circuit to terminal 99 of motor 75. In this way a truck disposed at position A will be capable of opening gate 65, directly or indirectly, depending upon the form the structure may take. This, again, is accomplished through the interruption of the light beam of light source L1 leading to photocell unit 92.

What is accomplished hence in the present invention, is a manually or automatically operated, intermittent or continuous process and/or system for receiving refuse such as municipal waste from a town or other municipality or series of municipalities, and converting this municipal waste into a useful fertilizer material.

In summary, then, the process and system comprehend the processing of received municipal waste into a usable fertilizer product. The end product may comprise merely a soil conditioner, in which some organic or other fertilizer agent is present. Such presence may be constituted merely by the inherent nature of the municipal waste received or, and preferably, by fertilizer additives and/or sludge from a sewer treatment system with which the present system is preferably incorporated. Provision is made in the system for recovering metals contained in the municipal waste, where desired. The municipal waste is processed into a slurry for introduction into the mixing and roasting stages of the system. Most liquid will be eliminated automatically in the mixing stage, and practically all the remaining moisture will be evaporated out of the mixer output at the roasting stage, the roasted product being substantially bacteria-free.

At the mixing mill stage, means are provided for receiving fertilizer additives or even sewage sludge, at this stage, into the slurry to enrich the final fertilizer product. It is deemed essential that a ball-mill stage is used in order to produce the requisite slurry needed. A separate liquid supply is connected at the ball-mill stage performing the slurry at this stage. Preferably the liquid supply is received as liquid from a conventional sewage treatment plant.

Other refinements of the system and the process are possible as, for example, by the inclusion of a paper bag facility as above described, by suitable grinding stages, screening stages, etc.

The term bagging and bags as used herein refer not only to paper bags but also to boxes and other types of containers. Fertilizer end product refers not only to sewage or chemically enriched slurries, but also simply to municipal waste slurries wherein no additives are supplied. The crushing stage receiving the municipal waste initially, see FIG. 1A, will be understood to include crushers as well as crushers and shredders combined in single stage or multistage units.

In FIG. 8 the shredder 138, as in the case of the primary grinding unit of FIG. 1 as well, may comprise, for example, a hammer-mill-type shredder such as that currently manufactured by the Heil-Gondard Company. Such a shredder has a through-put of 10 to 15 tons per hour and accomplishes a size reduction to the order of 3 inches in diameter or less relative to output particles. A preferred type of shredder is the Eidal-type grinding shredder which operates on a principle similar to that of a pencil sharpener, substituting only intermeshing gears in lieu of blades. Such a shredder reduces input materials to particulate matter having a thumb size, i.e., about an inch and a half or less. This same shredder has a through-put of about 90 tons per hour and can be utilized to reduce large articles. Large articles such as automobile bodies can currently be reduced by large hammer-mill-type shredders other than the specific one referred to.

Coupled to the output of shredder 138 is a wet-grind ball-mill stage 139. The ball-mill stages 139 and 141 may comprise ball-mills known currently as the Marcy-type ball-mill. Such ball-mills include cylindrical rotating drums having opposite hubs which are journaled to inlet and output pipes or tubes. The inner wall of the rotating drum of the ball-mill is provided with ball lifters for lifting balls so as to allow the conventional balls to be lifted up and then dropped during the rotation of the mill.

To the output of ball-mill stage 139 is connected a screen separator 140 taking the form of a conventional screen, over which passes floatables such as rubber, wood, and plastics to dry-grind ball-mill stage 141, coupled to the screen separator 140. Material passing through the screen within screen separator 140 such as the ground nonfloatables coming from the output of ball-mill stage 139, as well as a liquid phase, are passed downwardly into a solids-liquid separator such as a conventional Akins classifier. (See separator 142.) Mixer 144 has a pair of inputs 145 and 146 respectively connected to solids-liquid separator 142 and also to the dry-grind ball-mill stage 141. Chemical additives and the dried sludge of a sewer treatment settling pond, as indicated in FIG. 7, may be added to the input to mixer 146.

Mixer 144 is coupled to roaster 149 the latter of which may take the form of a Skinner-type vertical hearth roaster which will be operated at a roasting temperature of 600° F. or less. The roaster may be connected to a conventional compactor and pelletizer 150 if desired. Liquid source 151 may be the liquid phase of the output from a primary or secondary digester, the solids' phase of the primary digester of a sewage treatment plant, and/or comprise some other aqueous source connected to the shredder output at point R.

In operation, municipal waste is deposited into shredder 138. This municipal waste may comprise any number of items such as food particles, plastic coated containers, all types of paper and wood containers, rubber, plastics, shoes, ferrous and nonferrous metals, even broken furniture pieces and auto body portions. Ferrous metal fragments are removed at this stage by electromagnet 152. The shredded material coming from shredder 138 can be premixed or postmixed with liquid from one or more liquid sources. Accordingly, a solids-liquid mixture present at point R is fed into the wet-grind ball-mill stage 139. The purpose for the introduction of liquid and mixing the same with solids is to provide a very rapid grind reduction into powder within the ball-mill stage 139. It has been discovered by the inventor that the time required to reduce to powder municipal waste in a wet environment is reduced by a factor of three relative to the time needed to reduce the same material in a dry-grind ball-mill stage. The water level within the ball-mill stage 139 will be maintained essentially at the axial position of the ball-mill so that water, the ground materials within the ball-mill stage, and the nonground floatables will proceed from the output of the ball-mill stage to enter the screen separator 140. It is to be noted that the ball-mill stage will adequately reduce to a powder suspended within the liquid all nonfloatables such as rock, dirt, pieces of certain types of wood, any metals present, wadded cotton, fabric, paper and so forth. This powder in effect will be suspended in solution in the liquid within the wet-grind ball-mill stage 139 and will proceed out the hollow output hub thereof toward the screen separator, together with the nonground floatables, such as plastics, rubber, and most wood products. The materials not passing through the screen in screen separator 140 are routed to dry-grind ball-mill stage 141 whereas the water and the suspended particles produced in ball-mill stage 139 will be routed to solids-liquid separator 142 such as an Akins classifier. This separator serves to separate the liquid for routing back to the liquid source, by pumping or otherwise, and serves further to route the solids produced to mixer 144. Such conveyance may be accomplished as by a conveyor belt. It is important to note relative to the dry-grind ball-mill stage 141 that a heat source is supplied exterior to the rotating cylindrical drum of the ball-mill. Heat is supplied exterior to the ball-mill stage 141 by a heat source 148 such as a natural gas source to feeding burner 147. The purpose for supplying heat to the ball-mill is to dry the materials preparatory to their introduction into mixer 144. It is noted that materials will tend to stick on to the inside wall of the ball-mill stage either where no heat is supplied the ball-mill stage or where a heated gaseous media, such as heated air, is introduced through the ball-mill stage. The reason for this is that the material tends to collect adjacent the sidewall of the ball-mill stage and the balls will tend to separate any dry air from the material so that the material will indeed stick to the sides and not be discharged properly. The present invention avoids this difficulty by heating from the exterior the inside wall of the ball-mill to a temperature above the vaporization point of water so that the moisture will be evaporated from the ball-mill and allow the material to be ground to a fine dry powder, for routing to mixer 144.

Material coming from separator 140 will contain very little moisture and will be mixed with the material coming from dry-grind ball-mill stage 141, for subsequent routing to roaster 149. Where the output material is to be utilized as a compost material, the roaster temperature will not exceed 600° F. Preferably the material shall be introduced into and be retained by the roaster for a period of not more than 15 minutes. This is for the purpose of thoroughly drying the material and killing the bacteria therein. The material at 149 is subsequently routed to a compactor and pelletizer 150 for convenient bagging and storage as compost.

It is noted that the liquid system may be a completely closed system if desired, with the liquid returned at 143 being routed back to the liquid source 151 as by pumping, gravity, or any other suitable manner.

It is noted that the present invention employs a ball-mill to pulverize all anticipated types of municipal waste. Ferrous metals may be removed either prior to or immediately after the shredding step at shredder 138. Any remaining metals will be reduced in the wet-grind ball-mill stage 139. It is noted that the present invention recognizes that both floatables and nonfloatables will be present in municipal waste. Provision of the double ball-mill system, wet-grind and dry-grind, makes possible the adequate reduction of both forms of municipal waste. While not strictly necessary, it is recommended that the outputs from both ball-mill stages be combined, especially for composting where improved tilth characteristics of the output product are desired.

While it is preferred to apply heat directly to the exterior of the revolving drum of the ball-mill stage 141, it is conceivable that a dryer stage may precede the ball-mill in which the material passing into ball-mill stage will already have been dried.

The advantages of the inventor's mechanical composting system over conventional biochemical systems cannot be overemphasized. In the first place, large storage capacities for incoming municipal waste, as systematically required by conventional composting systems, are avoided in the present invention. Additionally, a through-put time cycle of from 6 to 44 days as in the case of conventional biochemical systems is reduced to a point of 2 hours or less to complete the reduction and roasting process to produce the compost end product. Thirdly, conventional biochemical systems require a prior hand sorting of materials such as rubber, plastic, metals, and sometimes even waxed cartons, preparatory to introduction of the materials into the biochemical plant for biological action, and, thereby reduction. The present invention in contrast requires no hand sorting. It is all completely mechanical; rubber, leather, and other products are reduced to powder form during the operation of the process and system together with all other matter in the municipal waste.

For further clarification as to the sewage treatment plant, sludge as a liquid output from the primary digester will comprise about 80 percent liquid and 20 percent suspended solids by volume, and sludge as a liquid output from the secondary digester thereof will comprise about 30 percent liquid and 70 percent suspended solids by volume. Dried sludge from the settling pond thereof consists of easily pulverized cake.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a municipal waste processing system, means for shredding municipal waste, first ball-mill means for reducing the so-shredded municipal waste to powder; sewage treatment plant means for introducing a liquid output into said first ball-mill means to mix with said shredded municipal waste therein, said first ball-mill means thereby producing an output of ground nonfloatables, nonground floatables, and liquid; separating means for separating said nonground floatables from said ground nonfloatables and said liquid, and second ball-mill means for dry-grinding said nonground floatables therein.

2. The system of claim 1 wherein said municipal waste processing system also includes solids-liquid separator means coupled to said first ball-mill means for receiving and separating liquid and ground nonfloatables in the output therefrom, means returning the so-derived liquid back to said first ball-mill means, and means for mixing said ground nonfloatables with the output of said second ball-mill means.

3. The system of claim 1 wherein sewage treatment plant means introduces a liquid, sewage-sludge slurry into said first ball-mill means.

4. The system of claim 2 wherein said municipal waste processing system comprises a composting plant and mixing means and constructed to receive the output therefrom for roasting without incinerating said contents, at a temperature under 600° F.

5. The system of claim 3 wherein said system includes means for applying heat to the exterior of said second ball-mill means to raise the temperature of the interior thereof and thereby vaporize moisture from municipal waste contents therein.

6. The system of claim 4 wherein said municipal waste processing system includes means for introducing chemical additives into said mixing means.

7. In a municipal waste processing system, a first, wet-grind ball-mill stage, means for introducing into said first ball-mill stage a slurry comprised of sewage plant liquid sludge and shredded municipal waste, means coupled to said first ball-mill stage for receiving the output therefrom and separating nonground floatables from ground nonfloatables and liquid thereat, a second ball-mill stage coupled to said separating means and constructed to receive said nonground floatables for dry-grinding the same, solids-liquid separator means coupled to said separating means and constructed to separate liquid from solids thereat, mixer means for mixing said solids with the output of said second ball-mill stage, roasting means coupled to said mixing means constructed to receive the output therefrom for roasting to a temperature under 600° F. contents thereof, and compactor and pelletizing means for compacting and forming into pellets the resultant product from said roasting means.

8. A mechanical composting plant including, in combination, means for receiving municipal waste and reducing the size thereof, means for mixing liquid sewage sludge with said municipal waste, ball-mill means coupled to said receiving and reducing means for grinding into powder the output thereof in a fluid environment comprised of said liquid sewage sludge, means coupled to said ball-mill means, for separating solids from the liquid in said fluid environment and means for roasting the remaining solids to reduce bacteria count and dry said output.

9. In a municipal waste processing system, ball-mill means for receiving municipal waste and reducing the same to a powdered form, and means for applying heat to the exterior of said ball-mill means to vaporize the moisture from the municipal waste during the operation of said ball-mill means, means for mixing dried sewage sludge with the output of said ball-mill means, and means for roasting without incinerating the resultant mixture at a temperature under 600° F.

* * * * *